June 28, 1949.    F. G. MARBACH    2,474,788
WELDING ELECTRODE
Filed Jan. 21, 1947

INVENTOR.
FRANK G. MARBACH
BY
Kwis, Hudson, Boughton & Williams
ATTORNEYS

Patented June 28, 1949

2,474,788

UNITED STATES PATENT OFFICE 2,474,788

WELDING ELECTRODE

Frank G. Marbach, Cleveland, Ohio, assignor to Morrison Products, Inc., Cleveland, Ohio, a corporation of Ohio Application January 21, 1947, Serial No. 723,354

6 Claims. (Cl. 219—4)

1

This invention relates to welding electrodes and as one of its objects aims to provide an improved construction for such electrodes, and particularly for electrodes to be used in spot welding operations on work having portions in relatively close formation.

In order to carry out spot welding operations on work having closely spaced portions, it has been necessary to provide an electrode in which the work-engaging tip is carried by a projection of relatively reduced size so as to permit the tip to be inserted between the closely spaced portions. For welding operations on work of this kind the tip itself is relatively thin or slender and is therefore subject to rapid wear and to so-called "mushrooming" as the result of the heat and pressure to which the tip is subjected. When the tip becomes badly worn or distorted the electrode must be replaced if a high quality welded product is to be produced and such replacements have heretofore represented a considerable item of expense. The present invention overcomes or minimizes this difficulty by providing in an electrode of this kind certain distinct improvement features of real importance.

It is, therefore, in accordance with another object of this invention that the reduced projection of the electrode body is provided with a tip which can be removed and replaced at small cost instead of scrapping the entire electrode as has been necessary heretofore.

A further object is to provide a welding electrode of the character mentioned, in which a cooling fluid passage is so formed and disposed as to extend to a point adjacent to the tip for enabling the cooling fluid to carry away excess heat which would otherwise result in damage to the tip.

Still another object is to provide an improved construction for a welding electrode of the type having a projection of relatively reduced thickness carrying a work-engaging tip, wherein cooling fluid passage portions extend into the electrode in converging relation toward the tip so as to form a continuous cooling passage which can be carried into the reduced projection for a substantial distance and usually to a point adjacent to the tip.

The invention can be further briefly summarized as consisting in certain novel combinations and arrangements of parts hereinafter described and particularly set out in the appended claims.

In the accompanying sheet of drawings

Figure 1:
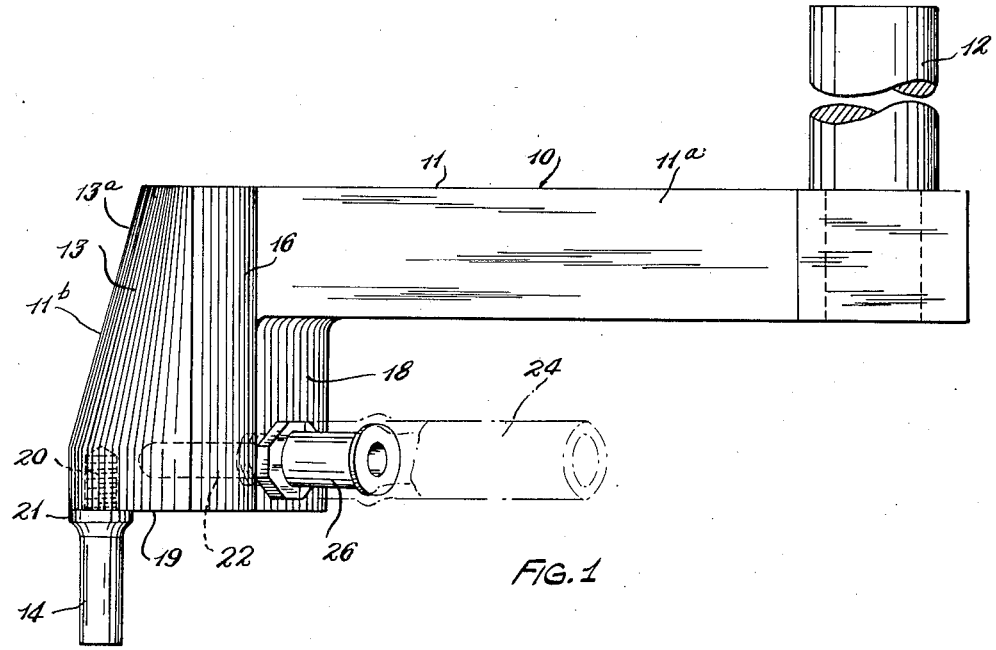
Figure 2:
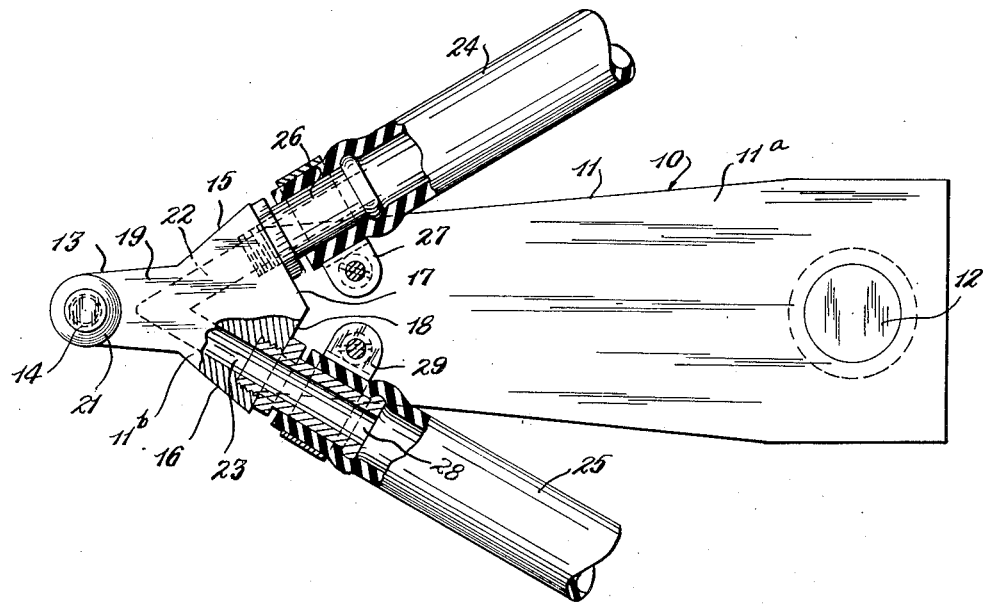

Fig. 1 is a side elevation of a welding electrode embodying the present invention, and Fig. 2 is a bottom plan view of the electrode with portions of the cooling fluid connections thereof broken away.

As one embodiment of the invention, the drawings show an electrode 10 for use in spot welding operations and which is provided with a body 11 formed of suitable electrically conducting material such as copper or copper alloy. The body 11 includes a laterally or rearwardly extending arm or projection 11a by which the electrode is adapted to be supported from a suitable holder and which projection can be of a length appropriate for the characteristics of the work on which the electrode is to be used. The projection 11a may be provided adjacent one end thereof with a projecting stem 12, or the like, for engagement in the holder from which the electrode is to be supported. The body 11 also includes a head 11b which is connected with the forward end of the projection or arm 11a and extends in depending relation thereto.

For adapting the electrode 10 for use on work having relatively closely spaced portions, the head 11b is constructed so as to have a forwardly extending integral projection 13 of relatively reduced thickness which carries a work-engaging tip 14. The projection or rib 13 may be of any appropriate length suitable for the characteristics of the work and is here shown as extending for substantially the full height of the head 11b and as having a rounded front edge. The upper portion of the rounded front edge of the reduced integral projection 13 can be rearwardly inclined as indicated at 13a in Fig. 1. The head 11b is preferably constructed with a pair of forwardly converging upright side faces 15 and 16 thereon which extend for substantially the full height of the head and a pair of rearwardly converging upright side faces 17 and 18 which are located below the rearwardly extending projection 11a.

The work-engaging tip 14 projects outwardly from the reduced projection 13 and, in this instance, extends in depending relation thereto as shown in Fig. 1. The tip 14 is here shown as being relatively slender and of stem-like form so as to be capable of entering the narrow spaces between adjacent portions of the work without coming into accidental short-circuiting engagement with such portions. The tip 14 is mounted on the head 11b by having one end thereof connected to the reduced integral projection 13 so as to extend downwardly at substantially right angles to the bottom face 19 thereof.

In accordance with one feature of the present invention the tip 14 is removable from the head 11b so as to be capable of being replaced at relatively small cost and, to this end, a detachable connection is provided between the tip and head. Any suitable form of detachable connection can be employed for this purpose, such as by providing the head with an internally threaded opening in which a threaded projection 20 of the tip is adapted to be screwed. The end of the tip which is connected with the head 11b can be provided with an annular shoulder 21 for abutting engagement with the bottom face 19 when the threaded projection 16 has fully entered the threaded opening of the head.

In accordance with another feature of this invention, cooling fluid is circulated through the head 11b by means of a passage which lies wholly within the confines of the head and is so formed that it extends into the reduced projection 13, preferably to a point adjacent the connection of the tip 14 therewith. This cooling fluid passage comprises passage portions 22 and 23 which can be substantially straight bores formed in the head 11b so as to extend thereinto in forwardly converging relation as shown in Fig. 2. The inner or forward ends of the passage portions 22 and 23 intersect so that these passage portions form a continuous passage for the cooling fluid in which the passage portion 22 may be the inlet and the passage portion 23 may be the outlet.

By having the passage portions 22 and 23 extend into the head 11b in the converging relation shown in Fig. 2, it will be seen that the cooling passage formed thereby can be carried for a substantial distance into the integral reduced projection 13 and, if desired, can be extended into the projection to a point adjacent the connection of the tip 14 therewith. The cooling passage thus provided will serve to conduct a continuous stream of cooling fluid, such as water, through the head and the path of the fluid will be sufficiently close to the tip 14 to be very effective in carrying away excess heat which might otherwise result in damage to the tip. Moreover, since the cooling passage lies wholly within the solid body portion of the head 11b and is devoid of joints and packings there are no points at which leaks can develop.

When the electrode 10 is constructed as above described with the rearwardly converging upright sides or faces 17 and 18 thereon, the forwardly converging cooling passage portions 22 and 23 extend into the head 11b from these rearwardly converging faces and this facilitates the forming of the cooling passage in the head. Moreover, by having the openings of the cooling passage located in the rearwardly converging faces 17 and 18, the supply and discharge conduits 24 and 25 which serve the cooling passage will be located in a convenient and protected position beneath the rearwardly extending arm or projection 11a.

The conduits 24 and 25 can be hoses or other suitable flexible conduit members for conducting the water or other cooling medium to and from the cooling passage of the electrode. The supply conduit 24 can be connected with the inlet passage portion 22 by means of a suitable fitting 26 which projects rearwardly from the face 17 and to which one end of the conduit is secured by means of the clamp 27. The conduit 25 is connected with a similar fitting 28 projecting from the face 18 and is secured to such fitting by the clamp 29.

My Patent No. 2,291,480, granted July 28, 1942, shows a blower wheel constructed of sheet metal and comprising formed parts which are connected together at numerous points by spot welding. The blower wheel of said patent is an example of work of the type having portions in relatively closely spaced formation and on which the improved electrode 10 can be used to advantage in spot welding operations. It will be understood of course that the improved electrode 10 can also be used on various kinds of work other than the blower wheel disclosed in said patent.

From the foregoing description and the accompanying drawing it will now be readily understood that this invention provides an improved welding electrode of the type having a relatively reduced projecting portion and wherein a work-engaging tip is detachably mounted on the reduced projection so that it can be readily replaced at small cost when the tip becomes worn. It will also be seen that the improved electrode embodies a cooling fluid passage which is formed by forwardly converging passage portions so that the cooling passage can be carried for a substantial distance into the reduced projection for effective cooling of the tip.

Although my improved welding electrode has been illustrated and described herein in some detail, it will be understood of course that the invention is not to be regarded as being correspondingly limited in scope but includes all changes and modifications coming within the terms of the appended claims.

Having thus described my invention, I claim:

1. A welding electrode comprising a head having an integral forwardly projecting portion of relatively reduced thickness and another projecting portion extending rearwardly from said head adjacent the top thereof and adapted for mounting the electrode on a holder, said head having a pair of upright side faces converging toward said forwardly projecting portion and a pair of upright rearwardly converging faces beneath the rearwardly extending projection, and a tip carried by said forwardly projecting portion and adapted for engagement with the work, said head having forwardly converging cooling fluid passage portions extending thereinto from said rearwardly converging faces so as to form a continuous passage which extends at least part way into said forwardly projecting portion.

2. A welding electrode comprising a substantially solid metal body having a portion adapted for connection with a support and an integral projecting portion of relatively reduced size, said body having a continuous cooling fluid passage extending therethrough and lying wholly within the confines of said body, said passage being formed by bores extending into the body in angularly converging relation toward said reduced portion and with their inner ends extending into and intersecting within said reduced portion, and a tip connected with said reduced portion at a point close to but spaced from the intersection of said bores and forming a work engaging extension of said reduced portion.

3. A welding electrode comprising a substantially solid metal body having an arm portion adapted for connection with a support and a head portion connected with one end of said arm portion and extending therefrom in angular relation to the axis of said arm portion, said head portion having thereon an integral projecting portion of relatively reduced size, said body having a continuous cooling fluid passage extending therethrough and lying wholly within the confines of said head portion, said passage being formed by bores extending into the head portion in angularly converging relation toward said reduced portion and with their inner ends extending into and intersecting within said reduced portion, and a tip connected with said reduced portion at a point close to but spaced from the intersection of said bores and forming a work engaging extension of said reduced portion, the connection of said tip with said reduced portion being detachable so as to permit removal and replacement by a new tip.

4. A welding electrode comprising a laterally elongated metal body having a substantially solid head formed integral with one end thereof, said head having a projecting integral portion of relatively reduced size on the forward side thereof and a pair of angularly disposed substantially flat faces on the rear side thereof and said head also having a continuous cooling fluid passage extending therethrough and lying wholly within the confines of the head, said passage being formed by bores extending into the head in angularly converging relation from said substantially flat faces and toward said reduced portion and with their inner ends extending into and intersecting within said reduced portion, and a tip connected with said reduced portion at a point close to but spaced from the intersection of said bores and forming a work engaging extension of said reduced portion.

5. A welding electrode comprising a laterally elongated metal body having a depending substantially solid head formed integral with one end thereof, said head having a projecting integral portion of relatively reduced size on the forward side thereof and a pair of angularly disposed substantially flat faces on the rear side thereof and located beneath the underside of said body and said head also having a continuous cooling fluid pasage extending therethrough and lying wholly within the confines of the head, said passage being formed by bores extending into the head in angularly converging relation from said substantially flat faces and toward said reduced portion and with their inner ends extending into and intersecting within said reduced portion, and a tip connected with said reduced portion at a point close to but spaced from the intersection of said bores and forming a work engaging extension of said reduced portion, the connection of said tip with said reduced portion being detachable so as to permit removal and replacement by a new tip.

6. A welding electrode comprising a laterally elongated arm having means thereon adapted for connecting the electrode with a support, a head connected with said arm at one end thereof and extending in angularly offset relation to the axis of said arm, said head having a forwardly projecting vertical rib forming a carrier portion of relatively reduced width on the front thereof and also having forwardly converging side faces imparting to the head a tapered shape which merges into said carrier portion, said head also having a pair of angularly disposed substantially flat faces on the rear thereof and a continuous cooling passage lying wholly within the confines of said head, said passage being formed by bores extending into said head in angularly converging relation from said substantially flat faces and toward said carrier portion and with their inner ends extending into and intersecting within said carrier portion, and a work-engageable tip connected with said carrier portion at a point close to the intersection of said bores.

FRANK G. MARBACH.

REFERENCES CITED

The following references are of record in the file of this patent:

UNITED STATES PATENTS

| Number | Name | Date |
|---|---|---|
| 1,063,097 | Winfield | May 27, 1913 |
| 1,066,682 | Taylor | July 8, 1913 |
| 1,154,470 | Winfield | Sept. 21, 1915 |
| 1,779,365 | Von Henke | Oct. 21, 1930 |